US 6,608,414 B1

(12) United States Patent
Conley

(10) Patent No.: US 6,608,414 B1
(45) Date of Patent: Aug. 19, 2003

(54) APPARATUS FOR AND METHOD OF SEALING A LEAD EXIT ON A MOTOR

(75) Inventor: Donald W. Conley, East Alton, IL (US)

(73) Assignee: Emerson Electric Co., St. Louis, MO (US)

(*) Notice: Subject to any disclaimer, the term of this patent is extended or adjusted under 35 U.S.C. 154(b) by 204 days.

(21) Appl. No.: 09/693,730

(22) Filed: Oct. 20, 2000

(51) Int. Cl.$^7$ .............................. H02K 5/22; H02K 5/10
(52) U.S. Cl. .............................. 310/89; 310/71; 310/43; 277/602; 277/626
(58) Field of Search ............................... 310/43, 71, 87, 310/88, 89; 277/602, 626, 627, 650, 904

(56) References Cited

U.S. PATENT DOCUMENTS

| | | | | |
|---|---|---|---|---|
| 1,646,962 A | * | 10/1927 | Hillex | 310/71 |
| 1,799,071 A | * | 3/1931 | Smith | 310/89 |
| 2,004,866 A | | 6/1935 | Haldeman | 103/87 |
| 3,283,186 A | | 11/1966 | Perry | 310/71 |
| 3,324,228 A | | 6/1967 | Larsson | 174/65 |
| 3,440,592 A | | 4/1969 | Zelle | 339/14 |
| 3,502,917 A | | 3/1970 | Bizoe | 310/71 |
| 3,736,548 A | | 5/1973 | Double | 339/31 R |
| 3,814,961 A | | 6/1974 | Nelson et al. | 310/87 |
| 4,101,794 A | | 7/1978 | Miller et al. | 310/71 |
| 4,205,246 A | | 5/1980 | Wise et al. | 310/68 L |
| 4,523,117 A | | 6/1985 | Daniels | 310/71 |
| 4,585,964 A | | 4/1986 | Hildebrandt | 310/71 |
| 4,851,725 A | | 7/1989 | Keck | 310/71 |
| 4,897,571 A | | 1/1990 | Isozumi | 310/239 |
| 5,006,742 A | | 4/1991 | Strobl et al. | 310/88 |
| 5,015,894 A | | 5/1991 | Crow et al. | 310/71 |
| 5,086,244 A | | 2/1992 | Isozumi | 310/89 |
| 5,126,608 A | | 6/1992 | Sogabe et al. | 310/71 |
| 5,148,073 A | | 9/1992 | Tamura | 310/239 |
| 5,192,888 A | | 3/1993 | Fleer | 310/71 |
| 5,287,028 A | | 2/1994 | Suzuki et al. | 310/71 |
| 5,350,960 A | | 9/1994 | Kiri et al. | 310/194 |
| 5,414,318 A | | 5/1995 | Shimizu et al. | 310/239 |
| 5,519,273 A | | 5/1996 | Keck | 310/71 |
| 5,777,409 A | | 7/1998 | Keck | 310/71 |
| 5,889,343 A | * | 3/1999 | Bryant et al. | 310/71 |

FOREIGN PATENT DOCUMENTS

| | | | |
|---|---|---|---|
| DE | 1 125 027 | 10/1958 | |
| DE | 30 11 975 | * 1/1981 | H02K/5/22 |
| JP | 55-125051 | 9/1980 | H02K/5/22 |
| JP | 56-41746 A | 4/1981 | H02K/5/22 |
| JP | 58-192450 | * 11/1983 | H02K/5/22 |
| JP | 04-075444 | * 3/1992 | H02K/5/22 |
| JP | 08-37752 | * 6/1996 | H02K/5/22 |
| JP | 10-174346 | * 6/1998 | H02K/5/10 |

OTHER PUBLICATIONS

Translation of Japanese Patent 58–192450, Nov. 1983.*
Translation of German Patent 30 11 971 A1, Oct. 1981.*

* cited by examiner

Primary Examiner—Karl I. Tamai
(74) Attorney, Agent, or Firm—Thompson Coburn, LLP

(57) ABSTRACT

A gasket that seals a lead opening on an electric motor has opposite first and second surfaces and a lead opening passing through the gasket. The gasket has a wall projecting outwardly from the gasket first surface and extending around the gasket lead opening, defining a cavity adjacent the gasket lead opening. The gasket is positioned on the electric motor so that the gasket lead opening is aligned with an electric motor lead opening and motor leads pass through the gasket lead opening. A conduit box having a bottom wall with a lead opening is positioned on the electric motor with the gasket between the conduit box and the electric motor, the conduit box lead opening aligned with the gasket lead opening and the motor leads passing through the conduit box lead opening. A sealant is applied in the gasket cavity, and seals the gasket lead opening closed. The gasket wall prevents the sealant from contacting and adhering to the conduit box.

27 Claims, 3 Drawing Sheets

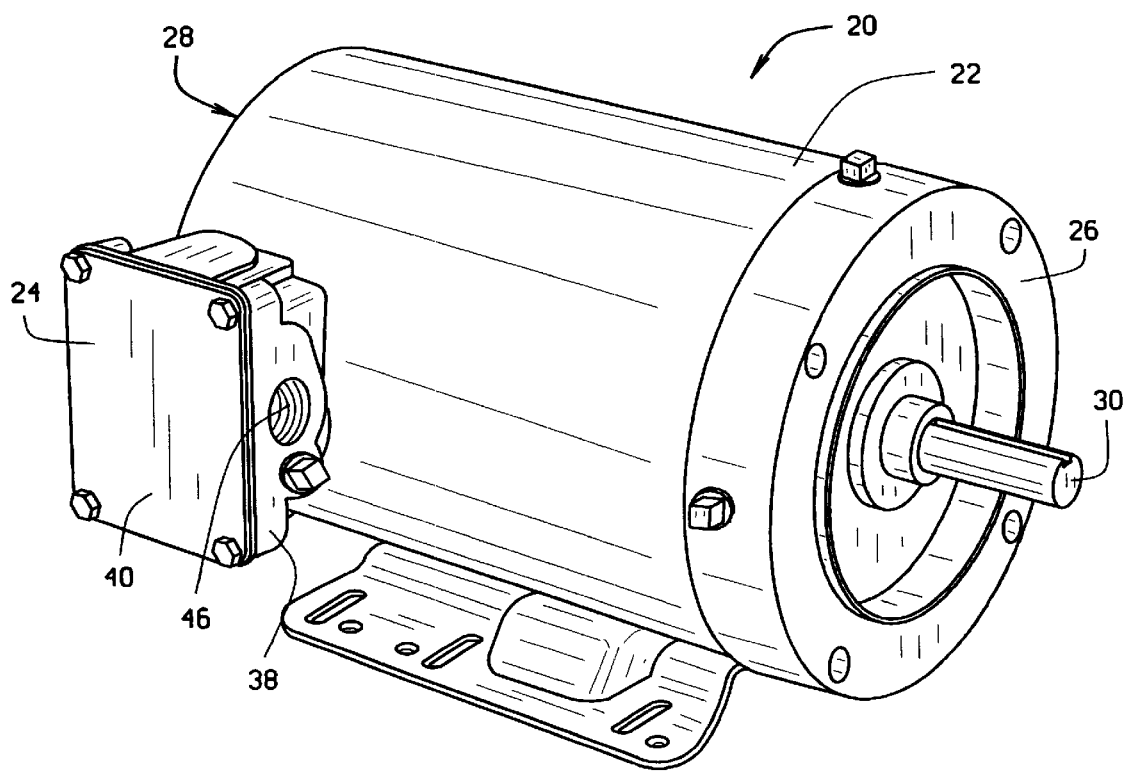
FIG. 1
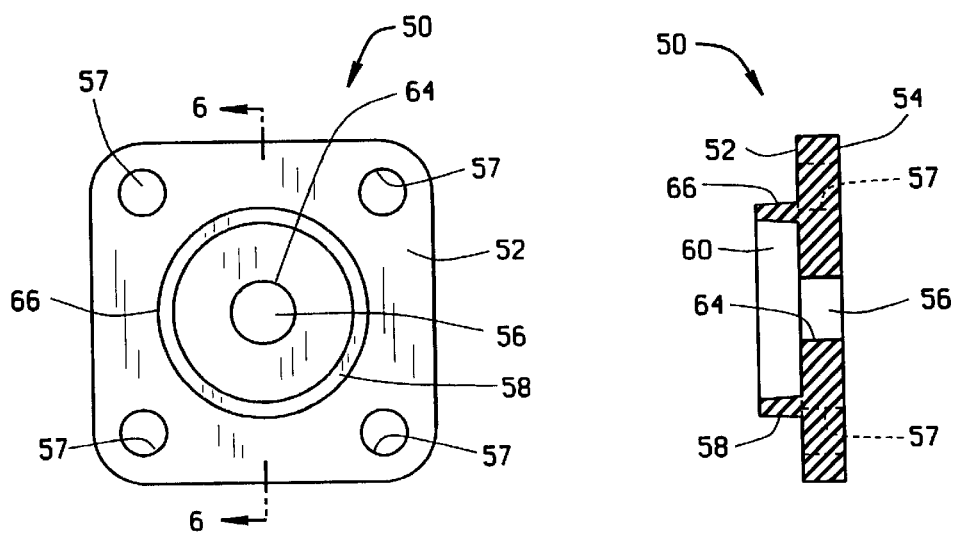
FIG. 5
FIG. 6

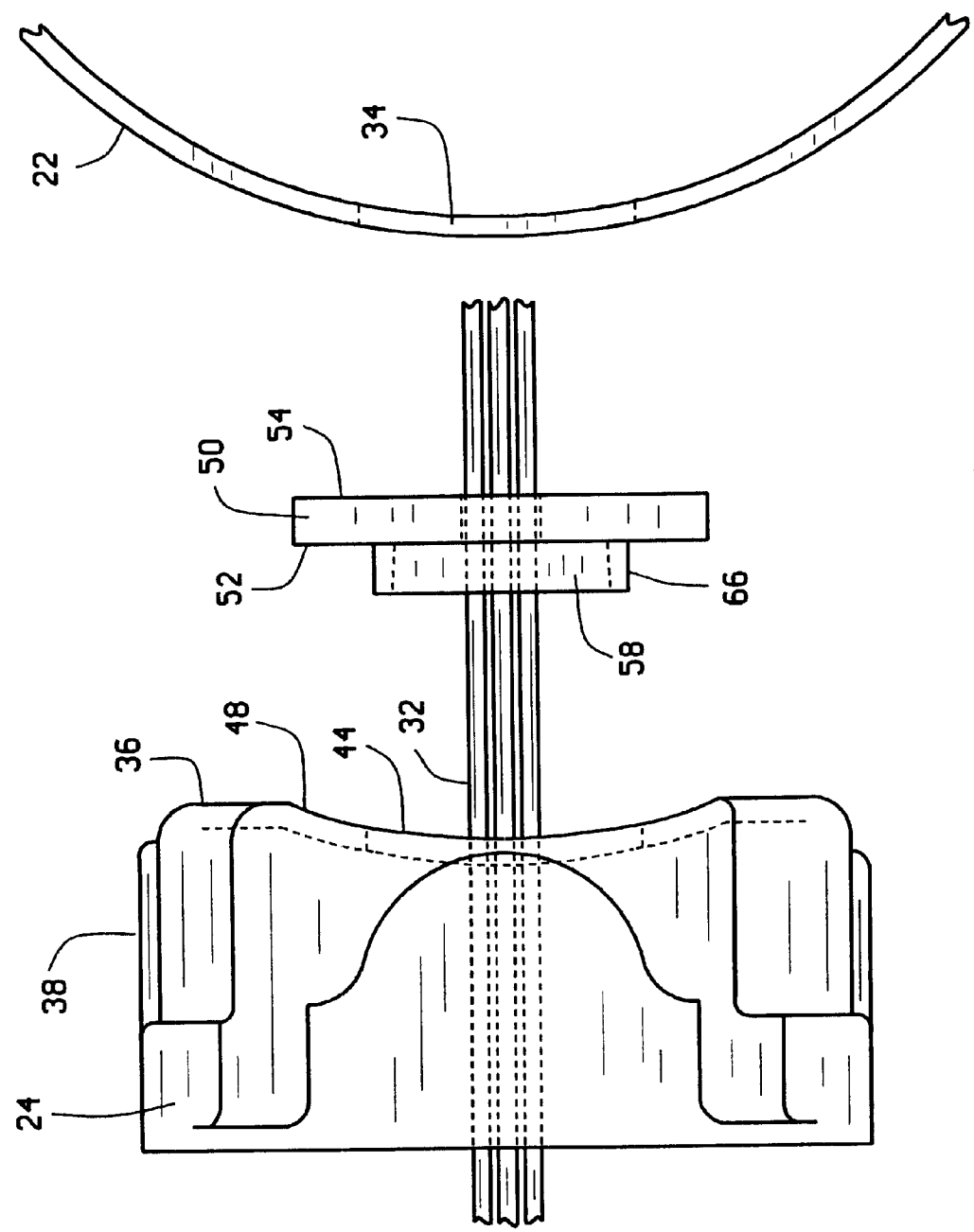

APPARATUS FOR AND METHOD OF SEALING A LEAD EXIT ON A MOTOR

BACKGROUND OF THE INVENTION (i) Field of the Invention

The present invention relates in general to a gasket, and particularly to a gasket that is used between an electric motor and a conduit box attached to the electric motor. The gasket provides a liquid tight seal between the electric motor and the conduit box. The gasket also provides a liquid tight seal between motor leads that extend from the electric motor and go into the conduit box and the gasket. Additionally, the gasket allows the conduit box to be detached from the electric motor and rotated to an alternate orientation relative to the electric motor and reattached to the electric motor in the alternate orientation without breaking the liquid tight seal between the motor leads and the gasket.

(ii) Description of the Related Art

Prior art gaskets used to form a liquid tight seal between an electric motor and a conduit box are well known in the art. These gaskets are typically used on electric motors used in food, beverage, or chemical processing plants where the electric motor is constantly exposed to high pressure washdowns or other high humidity or wet environments. These electric motors have a lead opening through which motor leads extend. The conduit box also has a lead opening. The conduit box is adapted to be attached to the electric motor with the conduit box lead opening aligned with the electric motor lead opening so that the motor leads can extend from the electric motor and into the conduit box through the electric motor lead opening and the conduit box lead opening. In the conduit box the motor leads are connected to a power source.

Typical prior art gaskets are made of a flexible and resilient material such as rubber or the like. These gaskets come in a variety of shapes and have opposite first and second surfaces that are generally flat. The gaskets are designed to be placed between the electric motor and the conduit box attached to the electric motor. The gaskets surround the lead opening on the electric motor and the lead opening on the conduit box. The gaskets also have a lead opening that allows the motor leads to pass through the gasket and into the conduit box. When the conduit box is attached to the electric motor the gasket is compressed between the two and forms a liquid tight seal between the electric motor and the conduit box. The compressed gasket prevents liquids from the exterior of the conduit box and the electric motor from entering the conduit box through the conduit box lead opening and from entering the electric motor through the electric motor lead opening.

The gaskets, however, do not prevent liquids from passing from an interior of the conduit box through the conduit box lead opening, through the gasket lead opening, through the electric motor lead opening and into the electric motor. To solve this shortcoming, a silicone sealant is applied to the gasket lead opening after the conduit box is attached to the electric motor. The sealant fills the gasket lead opening and surrounds the motor leads. The sealant also contacts and adheres to the electric motor lead opening and the conduit box lead opening. After curing for approximately 24 hours, the gasket in conjunction with the sealant provides a liquid tight seal between the interior of the conduit box and the electric motor. Because the sealant is in contact with and adheres to the conduit box lead opening and the electric motor lead opening, the conduit box can not be removed from the electric motor without breaking the seal formed by the sealant. When the seal formed by the sealant is broken, the sealant must be reapplied and allowed to cure for another 24 hours before the electric motor can be put into service.

The electric motors are generally cylindrical in shape and the conduit boxes have bottom surfaces that are concave and complementary to the cylindrical electric motors. Because of the concave bottom surface of the conduit boxes, the conduit boxes can be attached to the electric motors in one of two different orientations. The two orientations are 180 degrees apart. The conduit boxes have a power source opening for running a power source to the interior of the conduit box. The power source is connected to the motor leads in the conduit box interior. The power source opening is typically in a side wall of the conduit box. Because the conduit box is attached to the electric motor in one of two orientations, the power source opening will also be in one of two orientations.

In the typical application of the electric motors, the power source that is to be connected to the motor leads is in a fixed position and the orientation of the conduit box power source opening must coincide with the fixed position of the power source. If the orientation of the conduit box power source opening is incorrect, the conduit box must be removed from the electric motor and reattached to the electric motor in the correct orientation. Prior art electric motors with attached and sealed conduit boxes are disadvantaged in this respect because the removal of the conduit box from the electric motor breaks the seal formed by the sealant and requires the sealant to be reapplied and allowed to cure for 24 hours before the electric motor can be placed in service.

What is needed to overcome this disadvantage of electric motors with attached and sealed conduit boxes is an electric motor that has a gasket that allows the conduit box to be removed from the electric motor and reattached in a different orientation without breaking the seal formed by the sealant so that the electric motor does not need a 24 hour curing period before placing the electric motor in service.

SUMMARY OF THE INVENTION

The present invention overcomes shortcomings of prior art gaskets by providing a gasket that is configured and adapted to allow the conduit box to be removed from the electric motor and reattached to the electric motor in a different orientation without breaking the seal formed by the sealant and requiring the reapplication of a sealant and the resulting 24 hour curing period.

The gasket of the invention is configured and adapted to be positioned between an electric motor and a conduit box attached to the electric motor. The gasket forms a liquid tight seal between the conduit box and the electric motor. The gasket has opposite first and second surfaces and a lead opening that passes through the gasket. The gasket lead opening allows motor leads to pass through the gasket and enter the conduit box through a conduit box lead opening. The gasket first surface has a wall that projects outwardly from the gasket first surface and surrounds the gasket lead opening. The wall defines a cavity within the wall that is adjacent the gasket lead opening. A sealant, preferably an epoxy sealant although other sealants may also be used, is positioned in the cavity. The sealant seals closed the gasket lead opening and seals around the motor leads that pass through the gasket lead opening. The gasket and sealant thereby prevent any liquids in the conduit box from entering the electric motor through the gasket lead opening.

The gasket is preferably constructed of a resilient material. The resilient material allows the gasket lead opening to be dimensioned so that the gasket lead opening is stretched open to allow the motor leads to pass through the gasket lead opening. The gasket lead opening thereby holds the motor leads tightly together.

The gasket is positioned on the electric motor so that the gasket second surface is in contact with the electric motor and the gasket first surface is in contact with the conduit box. The gasket wall has a periphery that is dimensioned so that the gasket wall can be inserted into the conduit box lead opening without being constrained by the conduit box lead opening. The gasket wall periphery may be further dimensioned so that the gasket wall does not contact the conduit box lead opening. Alternatively or additionally, the gasket wall may be dimensioned so that the gasket wall projects outwardly from the gasket first surface a distance that enables the gasket wall to pass completely through the conduit box lead opening. Preferably, the conduit box lead opening is an annular lead opening and the gasket wall is an annular wall although this is not required.

Preferably, the sealant is positioned primarily within the cavity defined by the gasket wall. The gasket wall limits the sealant from contacting the conduit box. Because the sealant does not contact the conduit box, the conduit box can be removed from the electric motor and reattached to the electric motor in a different orientation without breaking the seal formed by the sealant within the gasket cavity. Preferably, the gasket lead opening is dimensioned so that the gasket lead opening and the motor leads passing through the gasket lead opening limit the sealant from flowing through the gasket lead opening and coming in contact with the electric motor.

In use, the gasket is positioned on an electric motor with the motor leads passing through the gasket lead opening and with the gasket second surface in contact with the electric motor. A conduit box is positioned on the electric motor on top of the gasket with the conduit box lead opening aligned with the gasket lead opening and the motor leads passing through the conduit box lead opening and into an interior of the conduit box. The conduit box is positioned against the gasket first surface so that the gasket wall projects into the conduit box lead opening. The conduit box is then attached to the motor by threaded fasteners. The gasket cavity is then filled with a sealant and the wall limits the sealant from contacting and adhering to the conduit box. The sealant is then allowed to cure and forms a liquid tight seal and seals closed the gasket lead opening. The conduit box may be removed from the electric motor and rotated 180 degrees without breaking the seal formed in the cavity by the sealant. The conduit box may then be reattached to the electric motor in the desired orientation.

BRIEF DESCRIPTION OF DRAWINGS

Further objectives and features of the present invention are set forth in the following detailed description of the preferred embodiment of the invention and in the drawing figures wherein:

FIG. 1 is a perspective view an electric motor with a conduit box attached to a side of the electric motor;

FIG. 4 is an exploded view showing the assembly of the electric motor, the gasket, and the conduit box;

FIG. 5 is a top plan view of the gasket; and

FIG. 6 is a cross sectional view of the gasket of FIG. 5 along line 6—6.

DETAILED DESCRIPTION OF THE INVENTION

Figures 2, 3:
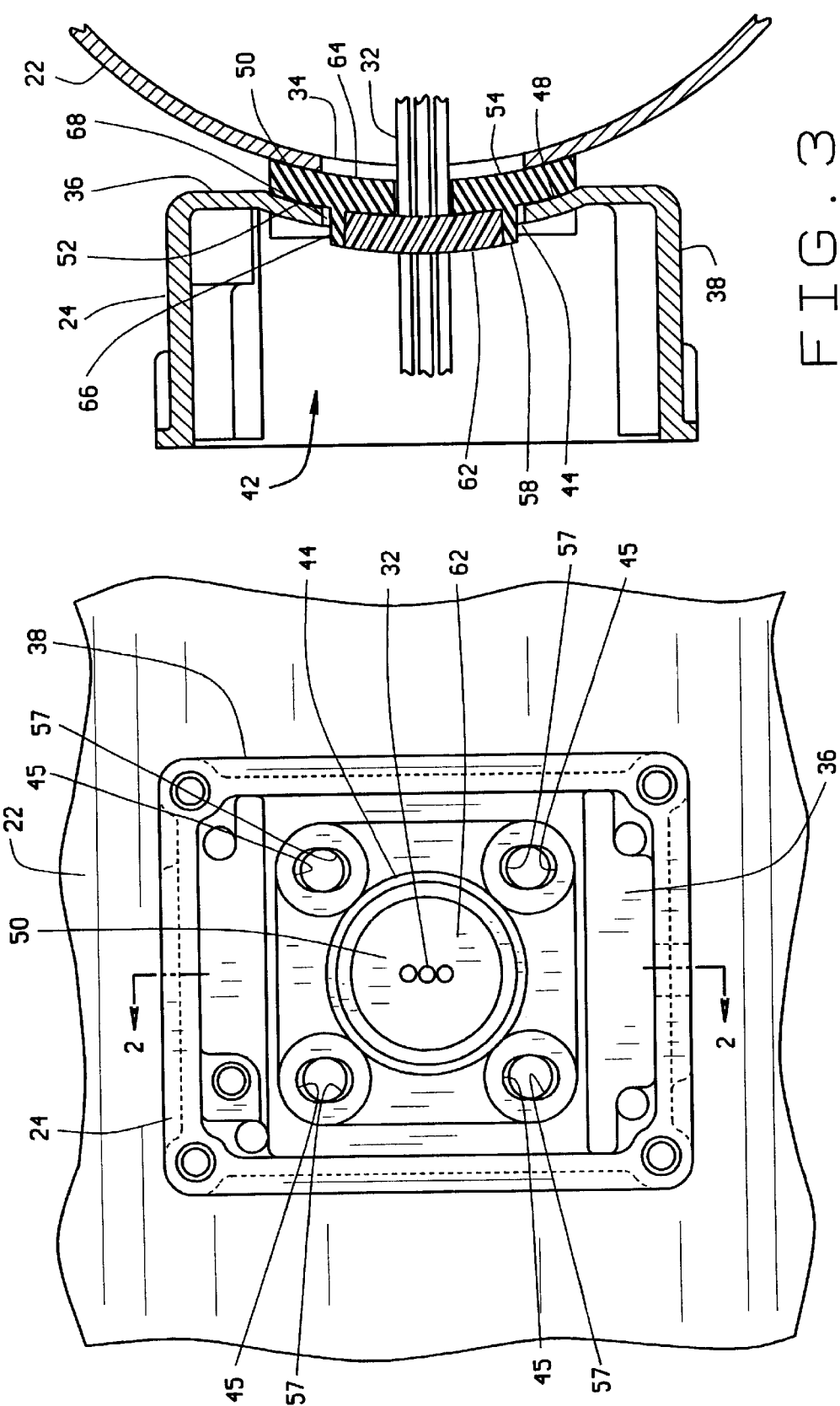
FIG. 2 is a top plan view of a conduit box attached to an electric motor with the cover plate of the conduit box removed.
FIG. 3 is a cross sectional view of the conduit box of FIG. 2 along line 2—2.

FIG. 1 shows an electric motor 20 having an outer motor shell 22. The motor shell 22 is shown as being generally cylindrical, however, it should be understood that not all motor shells 22 are cylindrical and the shape of the motor shell 22 does not alter the operation of the invention. A conduit box 24 is attached to the motor shell 22. The electric motor 20 has a shaft end 26 and an opposite back end 28. A shaft 30 projects outwardly from the electric motor 20 on the motor shaft end 26. The electric motor 20, as can be seen in FIG. 3, has motor leads 32 which extend through the motor shell 22 by passing through a motor shell lead opening 34. The motor leads 32 are to be attached to a power source (not shown) in the conduit box 24.

The conduit box 24 has a bottom wall 36, a side wall 38, and a cover plate 40. The conduit box bottom wall 36 and the side wall 38 define an interior 42 of the conduit box 24. The cover plate 40 is selectively removable from the conduit box 24 to allow access to the conduit box interior 42. The conduit box bottom wall 36 has a lead opening 44 to allow the motor leads 32 to pass through the conduit box bottom wall 36 and into the conduit box interior 42. The conduit box lead opening 44 is aligned with the motor shell lead opening 34 when the conduit box 24 is attached to the motor shell 22. Arranged around the box lead opening 44 are a plurality of fastener holes 45 that align with fastener holes (not shown) in the motor shell 22. Threaded fasteners, for example nut and bolt fasteners (not shown) are inserted through the aligned fastener holes of the conduit box and motor shell in attaching the box to the shell.

The conduit box side wall 38 has a power source opening 46 to allow power source or control source leads (not shown) to pass through the conduit box side wall 38 and into the conduit box interior 42 where they are connected to the motor leads 32. The conduit box power source opening 46 is shown as being oriented toward the shaft end 26 of the electric motor 20. However, as will be discussed below, the conduit box 24 may be attached to the motor shell 22 so that the conduit box power source opening 46 has a different orientation relative to the electric motor 20. Preferably, at least a portion 48 of the conduit box bottom wall 36 is concave and complementary to the generally cylindrical shape of the motor shell 22. However, it should be understood that the conduit box bottom wall 36 does not need to have a concave portion for the invention to operate. The conduit box bottom wall 36 can be of any shape that allows the conduit box 22 to be attached to the motor shell 22 and compress a gasket 50 positioned between the conduit box 24 and the motor shell 22. When the conduit box bottom wall 36 has a portion 48 that is concave and the motor shell 22 is cylindrical, the conduit box 24 may be attached to the motor shell 22 in two distinct orientations 180 degrees apart. For example, the conduit box 24 shown in FIG. 1 may be removed from the motor shell 22 and rotated 180 degrees and attached to the motor shell 22 so that the conduit box power source opening 46 is oriented toward the back end 28 of the electric motor 20. In this orientation, the concave portion 48 of the conduit box bottom wall 36 will still be complementary to the cylindrical motor shell 22.

The gasket of the invention 50 is similar to the prior art gaskets in that it is generally rectangular and has a narrow thickness between opposite first and second surfaces 52, 54 of the gasket. The gasket 50 has a lead opening 56 that extends through the gasket first and second surfaces 52, 54 for passage of the motor leads 32 through the gasket 50. A number of fastener holes 57 corresponding to the number of fastener holes in the conduit box and motor shell pass through the gasket. However, the gasket of the invention differs from gaskets of the prior art in that it includes a wall 58 that projects outwardly from the gasket first surface 52 and surrounds the gasket lead opening 56. The gasket wall 58 defines a cavity 60 within the gasket wall 58 adjacent to the gasket lead opening 56.

The gasket 50 is positioned on the motor shell 22 between the motor shell 22 and the conduit box 24 with the gasket first surface 52 against the conduit box 24 and the gasket second surface 54 against the motor shell 22. The gasket lead opening 56 is aligned with both the motor shell lead opening 34 and the conduit box lead opening 44. The gasket fastener holes 57 are aligned with the conduit box fastener holes 45 and the fastener holes of the motor shell (not shown). The gasket 50 is further positioned on the motor shell 22 so that the motor leads 32 pass through the gasket lead opening 56 and into the conduit box interior 42 through the conduit box lead opening 44. Threaded fasteners are inserted through the fastener holes of the conduit box, the gasket and the motor shell and secure the conduit box to the motor shell with the gasket therebetween.

Preferably, the gasket 50 is made from a compressible and resilient material such as rubber or the like. The gasket 50 is compressed when the conduit box 24 is attached to the motor shell 22 by the threaded fasteners. The compression of the gasket 50 causes the gasket 50 to form a liquid tight seal between the conduit box 24 and the motor shell 22. The liquid tight seal formed by the gasket 50 between conduit box 24 and the motor shell 22 prevents liquids on the exterior of the conduit box 24 and the motor shell 22 from entering the conduit box 24 or the electric motor 20 through the respective conduit box lead opening 44 and the motor shell lead opening 34. While the gasket 50 is preferably made from a resilient and compressible material, it should be understood that the gasket 50 may be made out of any material that is capable of forming a liquid tight seal between the conduit box 24 and the motor shell 22.

A sealant 62 is inserted into the gasket cavity 60. The sealant 62 surrounds the motor leads 32 passing through the gasket lead opening 56 and seals closed the gasket lead opening 56. Preferably, the sealant is an epoxy, however, it should be understood that any sealant that is capable of forming a liquid tight seal may be used. The gasket wall 58 retains the sealant 62 within the gasket cavity 60 and prevents the sealant 62 from coming in contact with and adhering to the conduit box 24. Because the sealant 62 is prevented from contacting and adhering to the conduit box 24, the conduit box 24 can be removed from the motor shell 22 and reattached to the motor shell 22 in the same or a different orientation without breaking the seal formed by the sealant 62. In addition, because the gasket wall 58 retains the sealant 62 within the gasket cavity in the area around the gasket lead opening 56 and around the motor leads 32 where it is needed, it prevents the over application of sealant 62 inside the conduit box. This enables a metered amount of sealant to be dispensed in sealing the gasket lead opening in assembling motors on a production line.

Preferably, the gasket lead opening 56 has a peripheral edge 64 that is dimensioned so that the gasket peripheral edge 64 is stretched when the motor leads 32 are passed through the gasket lead opening 56. The gasket peripheral edge 64 holds the motor leads 32 tightly together and secures the motor leads 32 within the gasket lead opening 56. Preferably, the tight fit between the gasket peripheral edge 64 and the motor leads 32 helps to prevent the sealant 62 from flowing through the gasket lead opening 56 and into the motor shell 22 prior to the sealant 62 curing.

Preferably, the conduit box lead opening 44 is an annular lead opening, and the gasket wall 58 is an annular gasket wall. However, it should be understood that the conduit box lead opening 44 and the gasket wall 58 may be of any shape as long as the shapes allow the conduit box 24 to be removed from and reattached to the motor shell 22 in the same or alternate orientations without breaking the seal formed by the sealant 62 in the gasket cavity 60.

The gasket wall 58 and the conduit box lead opening 44 are dimensioned so that the gasket wall 58 is not constricted by the conduit box lead opening 44 so that the conduit box 58 may be easily removed from and attached to the motor shell 22. Preferably, the gasket wall 58 has an outer peripheral edge 66 with an outer diameter that is less than an inner diameter of the conduit box lead opening 44 so that a gap 68 exists between the gasket wall outer peripheral edge 66 and the conduit box lead opening 44. However, it should be understood that the fit between the gasket wall 58 and the conduit box lead opening 44 is not critical to the operation of the invention as long as the conduit box 24 can be removed from and reattached to the motor shell 22 in the same or different orientations without breaking the seal formed by the sealant 62 in the gasket cavity 60.

The gasket wall 58 projects outwardly from the gasket first surface 52 a distance that enables the gasket wall 58 to extend into the conduit box lead opening 44. Preferably, the gasket 58 projects outwardly from the gasket first surface 52 a distance that enables the gasket wall 58 to extend past the conduit box bottom wall 36 and into the conduit box interior 42. However, it should be understood that the distance the gasket wall 58 projects outwardly from the gasket first surface 52 is not critical to the operation of the gasket so long at the gasket wall 58 forms a gasket cavity 60 that is large enough to retain enough sealant 62 to seal closed the gasket lead opening 56.

The method of sealing the motor shell lead opening 34 and the conduit box lead opening 44 with the gasket 50 of the invention involves first placing the second surface 54 of the gasket 50 on the motor shell 22 so that the gasket lead opening 56 is aligned with the motor shell lead opening 34. As the gasket is positioned against the motor shell 22 the motor leads 32 are passed through the gasket lead opening 56. The gasket is positioned on the motor shell 22 with its fastener holes 57 aligned with the motor shell fastener holes (not shown). The motor leads 32 are then passed through the conduit box lead opening 44 and the conduit box 24 is positioned against the motor shell 22 with the gasket 50 between the conduit box 24 and the motor shell 22. The conduit box lead opening 44 is aligned with the gasket lead opening 56 and the conduit box fastener holes 45 are aligned with the gasket fastener holes 57 and the motor shell fastener holes. The threaded fasteners are then inserted through the aligned fastener holes and tightened down, securing the conduit box to the motor with the gasket 50 compressed therebetween and with the motor leads 32 passed through the conduit box lead opening 44 and into the conduit box interior 42. The sealant 62 is then applied in the gasket cavity 60 so that the sealant forms a liquid tight seal between the motor leads 32 and the gasket wall 58 and seals closed the gasket lead opening 56. Because the gasket wall 58 prevents the sealant 62 from contacting and adhering to the conduit box 24, the conduit box 24 can be removed from and reattached to the motor shell 22 in the same or a different orientation without breaking the seal formed by the sealant 62 in the gasket cavity 60.

While the present invention has been described by reference to a specific embodiment, it should be understood that modifications and variations of the invention may be constructed without departing from the scope of the invention as defined by the following claims. For example, the seal may be employed between a housing electrical lead opening and any other type of lead enclosure and not necessarily a conduit box. Also, the gasket wall could be positioned extending into the motor shell lead opening instead of the conduit box lead opening.

What is claimed is:

1. An assembly for sealing an opening, the assembly comprising:
    a gasket having opposite first and second surfaces and an outer peripheral edge that extends around the first and second surfaces, a gasket opening positioned on the gasket and extending between the first and second surfaces for passage of an object through the gasket opening, a wall projecting outwardly from the gasket first surface, the wall being spaced inwardly from the outer peripheral edge and extending around the gasket opening defining a cavity within the wall and adjacent the gasket opening; and,
    a sealant positioned in the cavity sealing the gasket opening.

2. The assembly of claim 1, wherein:
    the gasket is constructed of a resilient material that enables the gasket opening to be stretched around an object passed through the gasket opening.

3. The assembly of claim 1, wherein:
    the sealant is positioned only within the wall defining the cavity.

4. The assembly of claim 1, wherein:
    the gasket opening is centered within the wall.

5. The assembly of claim 1, wherein:
    the gasket opening is the only opening through the gasket within the wall.

6. The assembly of claim 1, wherein:
    the gasket opening is circular and the wall is circular and concentric with the gasket opening.

7. In a device that seals between an electric motor and a conduit enclosure attached to the motor and that seals around leads of the motor that pass through a motor lead opening of the motor and an enclosure lead opening of the conduit enclosure, an improvement comprising:
    a gasket having opposite first and second surfaces, the first surface engaging against the conduit enclosure and the second surface engaging against the motor, a gasket lead opening positioned on the gasket for passage of the leads through the gasket lead opening, the gasket being constructed of a resilient material that enables the gasket lead opening to be stretched around leads passed through the gasket lead opening, a wall projecting outwardly from the gasket first surface and extending around the gasket lead opening defining a cavity within the wall and adjacent the gasket lead opening; and
    a sealant positioned in the cavity sealing the gasket lead opening and sealing around leads passed through the gasket lead opening.

8. The device of claim 7, wherein:
    the wall has a periphery that is dimensioned to enable the wall to be inserted into the enclosure lead opening without being constrained.

9. The device of claim 7, wherein:
    the sealant is positioned only within the wall defining the cavity and does not extend beyond the wall.

10. The device of claim 7, wherein:
    the wall has a periphery that is dimensioned to enable the wall to be inserted into the enclosure lead opening without the wall contacting the enclosure.

11. The device of claim 7, wherein:
    the wall projects outwardly from the gasket first surface a distance that enables the wall to pass completely through the enclosure lead opening.

12. A motor comprising:
    a motor shell and leads that exit the motor shell through a lead opening in the motor shell;
    a conduit box having a bottom wall and side walls extending at an angle from the bottom wall, the bottom wall and side walls of the conduit box defining an interior of the conduit box, the bottom wall having a conduit box lead opening and the bottom wall being attached to the motor shell so that the lead opening in the bottom wall is aligned with the motor shell lead opening;
    a gasket positioned between the conduit box and the motor shell to provide a liquid tight seal between the conduit box and the motor shell so that no liquid can enter the conduit box or the motor shell through the conduit box lead opening or the motor shell lead opening, the gasket having opposite first and second surfaces, the first surface having a projection that extends outwardly from the first surface and has a cavity within the projection, the cavity has a lead opening that extends through the gasket and the gasket first and second surfaces and aligns with the conduit box lead opening and the motor shell lead opening so that the leads extend from the motor, through the motor shell lead opening, through the gasket cavity lead opening, through the conduit box lead opening and into the conduit box interior; and
    a sealant residing in the gasket cavity, the sealant forming a liquid tight seal between the gasket cavity and the leads while limiting the sealant from coming in contact with the conduit box lead opening or the motor shell lead opening, the gasket thereby allowing the conduit box to be removed from the motor shell and rotated to an alternate orientation relative to the motor shell and reattached to the motor shell in the alternate orientation without breaking the seal between the leads and the gasket cavity formed by the sealant.

13. A motor comprising:
    a motor shell and leads that exit the motor shell through a lead opening in the motor shell;
    a conduit box having a bottom wall and side walls extending at an angle from the bottom wall, the bottom wall and side walls of the conduit box defining an interior of the conduit box, the bottom wall having a conduit box lead opening and the bottom wall being attached to the motor shell so that the lead opening in the bottom wall is aligned with the motor shell lead opening;
    a gasket positioned between the conduit box and the motor shell to provide a liquid tight seal between the conduit box and the motor shell so that no liquid can enter the conduit box or the motor shell through the conduit box lead opening or the motor shell lead opening, the gasket having opposite first and second surfaces, the first surface having a project that extends outwardly from the first surface and has a cavity within the projection, the cavity has a lead opening that extends through the gasket and aligns with the conduit box lead opening and the motor shell lead opening so that the leads extend from the motor, through the motor shell lead opening, through the gasket cavity lead opening, through the conduit box lead opening and into the conduit box interior;

a sealant residing in the gasket cavity, the sealant forming a liquid tight seal between the gasket cavity and the leads while limiting the sealant from coming in contact with the conduit box lead opening or the motor shell lead opening, the gasket thereby allowing the conduit box to be removed from the motor shell and rotated to an alternate orientation relative to the motor shell and reattached to the motor shell in the alternate orientation without breaking the seal between the leads and the gasket cavity formed by the sealant;

the conduit box lead opening is an annular lead opening;

the gasket projection is an annular wall that forms a cup on the first surface of the gasket, the annular wall being complementary to the conduit box annular lead opening; and the gasket cavity is an interior of the cup.

14. The motor of claim 13, wherein:

the annular wall is configured and adapted to extend past the conduit box bottom wall and into the conduit box interior.

15. The motor of claim 13, wherein:

the annular wall has an outer diameter, the conduit box annular lead opening has an inner diameter, and the annular wall outer diameter is smaller than the conduit box annular lead opening inner diameter so that a gap exists between the annular wall and the conduit box annular lead opening.

16. The motor of claim 13, wherein:

the gasket cavity lead opening is generally circular and generally concentric with the annular wall.

17. The motor of claim 13, wherein:

the gasket cavity lead opening has a peripheral edge that is configured and adapted to hold the leads tightly together by the peripheral edge of the gasket cavity lead opening.

18. The motor of claim 12, wherein:

the sealant is an epoxy.

19. The motor of claim 12, wherein:

the motor shell is generally cylindrical and at least a portion of the conduit box bottom wall is concave so that the portion of the conduit box bottom surface is complementary to the generally cylindrical motor shell.

20. A method of sealing a lead opening on a motor, the method comprising the steps of:

providing a motor in a motor shell, the motor having leads extending from the motor, providing a lead opening in the motor shell and positioning the leads through the lead opening in the motor shell;

providing a conduit box having a bottom wall and an interior, providing a lead opening in the bottom wall;

providing a gasket and positioning the gasket between the conduit box and the motor shell to form a liquid tight seal between the gasket and the conduit box and between the gasket and the motor shell, providing the gasket with opposite first and second surfaces and a projection extending outwardly from the first surface,
forming a cavity in the projection with the cavity having a lead opening that extends through the gasket first and second surfaces;

extending the motor leads through the gasket cavity lead opening;

placing the gasket on the motor shell so that the gasket cavity lead opening is aligned with the motor shell lead opening and so that the leads pass through the gasket cavity lead opening;

attaching the conduit box to the motor shell so that the gasket is between the conduit box and the motor shell and so that the gasket cavity lead opening is aligned with the conduit box lead opening and the leads pass through the conduit box lead opening and into the conduit box interior; and applying a sealant in the gasket cavity so that the sealant forms a liquid tight seal between the leads and the gasket projection.

21. The method of claim 20, wherein:

the step of providing a conduit box further comprises providing the conduit box lead opening as an annular lead opening; and the step of providing a gasket further comprises providing the gasket projection as an annular wall that is complementary to the conduit box annular lead opening and that forms a cup on the first surface of the gasket with the gasket cavity being an interior of the cup.

22. The method of claim 21, wherein:

the step of providing a gasket further comprises providing the gasket projection with a length extending from the first surface to extend past the conduit box bottom wall and into the conduit box interior.

23. The method of claim 21, wherein:

the step of providing a conduit box further comprises providing the conduit box annular lead opening with an inner diameter and the step of providing a gasket further comprises providing the gasket annular wall with an outer diameter that is smaller than the inner diameter of the conduit box annular lead opening so that a gap exists between the annular wall and the conduit box annular lead opening.

24. The method of claim 20, wherein:

the step of providing a gasket is further comprised of providing a gasket of resilient, elastic material and with the gasket cavity lead opening dimensioned to hold the leads tightly together by a peripheral edge of the gasket cavity lead opening stretched around the leads.

25. The method of claim 20, wherein:

the step of applying a sealant is further comprised of applying an epoxy sealant.

26. The method of claim 20, wherein:

the step of forming a cavity is further comprised of forming the cavity so that the cavity prevents the sealant from contacting the conduit box so that the conduit box may be detached from the motor shell and rotated to an alternate orientation relative to the motor shell and reattached to the motor shell in the alternate orientation without disturbing the liquid tight seal formed by the sealant.

27. The method of claim 20, wherein:

the step of providing a gasket further comprises providing the gasket projection with a length extending from the first surface to extend into the conduit box.

* * * * *